United States Patent

Wieczorek et al.

[11] Patent Number: 5,464,052
[45] Date of Patent: Nov. 7, 1995

[54] SECURITY SHADE WITH A MOTOR SPRING SUBASSEMBLY

[75] Inventors: Joseph P. Wieczorek, Madison Heights; Eugene M. Halajian, Harrison Township; Michael Trombley, Sterling Heights, all of Mich.

[73] Assignee: Takata, Inc., Auburn Hills, Mich.

[21] Appl. No.: 148,931

[22] Filed: Nov. 8, 1993

[51] Int. Cl.⁶ .................................................. E06B 9/08
[52] U.S. Cl. .................... 160/23.1; 160/314; 296/37.16; 242/385.1
[58] Field of Search .................... 160/23.1, 24, 314, 160/315, 316, 323.1, 324; 296/37.16, 97.8; 242/385.1, 385.2, 385.3, 385.4

[56] References Cited

U.S. PATENT DOCUMENTS

| | | | |
|---|---|---|---|
| 1,119,863 | 12/1914 | Nye | 160/315 |
| 1,341,530 | 5/1920 | Wise | 160/315 |
| 4,168,094 | 9/1979 | Yagi . | |
| 4,202,578 | 5/1980 | Roullier . | |
| 4,671,557 | 6/1987 | Lemp . | |
| 4,932,704 | 6/1990 | Ament . | |
| 5,031,682 | 7/1991 | Tedeschi . | |
| 5,351,743 | 10/1994 | Jackson | 160/323.1 X |

*Primary Examiner*—Blair M. Johnson
*Attorney, Agent, or Firm*—Harness, Dickey & Pierce

[57] ABSTRACT

A security shade for the cargo area of a motor vehicle. The security shade includes a flexible shade panel mounted to a roller tube having at least one support subassembly mounted to its ends. The subassembly further includes a housing and a coupling portion which couples the housing to the roller tube, a rotational biasing spring which rotationally biases the coupling portion relative to said housing and a mechanism for mounting the security shade within the vehicle.

24 Claims, 7 Drawing Sheets

SECURITY SHADE WITH A MOTOR SPRING SUBASSEMBLY

BACKGROUND AND SUMMARY OF THE INVENTION

This invention generally relates to a roller type shade and, more particularly, to a security shade adapted for use in a motor vehicle to obstruct the view into an interior compartment area of the vehicle by covering the compartment area.

In many styles of motor vehicles, a rear compartment or cargo area is provided for storing cargo or personal items. Previously, any articles in the cargo area could be easily viewed from the exterior of the vehicle. To discourage would be thieves, motor vehicle manufacturers now typically provide a retractable security shade or panel that can be extended to cover the cargo area and prevent anyone outside of the vehicle from readily viewing any stored articles.

Typically, security shades are comprised of a roller tube and flexible fabric panel, which is wrapped onto the roller tube, mounted to a support structure in the vehicle. The roller tube is rotationally biased so that the panel can be extended to cover the compartment area and retracted onto the roller tube for storage when not in use. The free edge of the shade panel is normally provided with a pull tube or stiffener having a handle that enables the panel to be conveniently extended. The pull tube also includes clips or tabs, typically on its ends, which engage brackets mounted to the vehicle sidewalls in the cargo area and maintain the panel in its extended position.

For many vehicles, the security shades are mounted so that the roller tube is positioned across one end of the cargo area with the shade panel being extendable rearward toward the vehicle's rear cargo door. Often the security shade is positioned behind a rear seat back which can be folded down to enlarge the cargo area of the vehicle. When the cargo area is enlarged, the security shade needs to be removed to prevent it from obstructing and limiting full use of the cargo area. For this reason, security shades often feature a mounting system which allows them to be easily removed from and reinstalled into the vehicle. This requirement involves incorporating a number of individual components into the security shade and adds to the overall cost and complexity of the unit.

The complexity of conventional security shades is derived from the high number of components which must be incorporated into the ends of the security shade to provide for, not only the removable mounting of the security shade system, but also the rotational biasing of the roller tube. In production these numerous components must be individually assembled together which is both cumbersome and labor intensive. Obviously, components which are readily adaptable to different vehicle applications, including different vehicle models and different vehicle widths, reduce the manufacturer's on-hand inventory requirements and ease production requirements.

A security shade according to this invention improves over existing devices with respect to the above referenced areas of concern. The present security shade is provided with a construction that simplifies manufacture, and reduces the number of individual components typically found in security shades. Specifically, the present invention provides for a roller tube support subassembly which is mounted to the ends of the roller tube and which provides for both the rotational biasing of the roller tube and the mounting of the security shade within the vehicle. This subassembly construction eases the complexity and labor intensity of assembly while also maintaining a prewound biasing force in the subassembly until final assembly with the roller tube. The various individual components of the subassembly are also capable of being utilized on either the left or right end of the security shade. Because of this, the present invention reduces the amount of inventory which must be kept on hand by the original manufacturer or repair facility.

Further objects, features and advantages of the invention will become apparent from a consideration of the following description and the appended claims when taken in connection with the accompanying drawings.

DETAILED DESCRIPTION OF THE PREFERRED EMBODIMENTS

Five embodiments of a security shade embodying the principles of this invention are generally shown in the Figures and designated by reference numbers 110, 210, 310, 410, and 510. The five embodiments each incorporate different features which might be required in a particular vehicle application. Two of the more readily apparent features are a cassette or trim cover and an axially compressible end. Both of these features are more fully discussed below. Generally, the first embodiment is a security shade 110 which includes a trim cover but not compressible ends; the second embodiment is a security shade 210 which includes compressible ends but lacks a trim cover; the third embodiment is a security shade 310 which also lacks a cover and has compressible ends; the fourth embodiment is a security shade 410 which lacks both a trim cover and compressible ends; and the fifth embodiment is a security shade 510 which includes both a trim cover and compressible ends. For convenience, those elements which serve common functions in the various embodiments are designated with like references in which the first digit (1, 2, 3, 4 or 5) of the reference number designates the respective embodiment.

Referring now to security shades in general and the first embodiment in particular, the security shade 110 includes as its principal elements a roller tube 112, a shade panel 120, a pull tube 130, and a roller tube support subassembly 140. The security shade 110 is positioned in the vehicle (not shown) so that it extends transversely between the side walls of the vehicle at one end of the cargo area and at a predetermined height above the support surface of the cargo area.

Formed in the roller tube 112 is a longitudinal anchor groove 114 which receives and anchors one end of the shade panel 120 thereto. The mechanism by which this end of the shade panel 120 is anchored within the groove 114 may be by any of the methods well known in the industry, including a J-clip or other fastening means inserted into the groove 114 or attached to the roller tube 112. This attachment mechanism is generally designated in FIG. 2 at 122.

The shade panel 120 is wound onto the roller tube 112 and has its free end secured over the pull tube 130. As further discussed below, the roller tube support subassembly 140 exerts a rotational biasing force on the roller tube 112 in a direction which maintains the shade panel 120 wound on the roller tube 112. When deployed, the pull tube 130 is pulled causing the shade panel 120 to unroll from the roller tube 112. At its fully extended position, clips or fasteners 132 on the ends of the pull tube 130 are engaged with corresponding brackets on the cargo area side walls to retain the shade panel 120 in its extended position covering the cargo area. When the clips 132 are disengaged, the rotational biasing force exerted by the roller tube support subassembly 140 winds the shade panel 120 back onto the roller tube 112.

As briefly mentioned above, if desired the security shade 110 can be provided with a cassette or trim cover 116 which overfits both the roller tube 112 and the wound shade panel 120. The trim cover 116 has its ends received in the roller tube support subassembly 140. The trim cover 116 protects the mechanical components of the security shade 110 from inadvertent damage, prevents foreign objects for interfering with its operation and aesthetically enhances the appearance of the security shade 110. A longitudinal slot 118 is provided in the trim cover 116 so that the shade panel 120 can be deployed from and retracted onto the roller tube 112.

The roller tube support subassembly 140 performs several functions and is designed to minimize the number of components necessary to construct the security shade 110, increase its ease of assembly, and reduce on-hand Inventory requirements as outlined above. Two of its principal functions include mounting the security shade 110 to the vehicle and providing the security shade 110 with a rotational bias that causes winding of the shade panel 120 onto the roller tube 112.

Figures 1, 2:
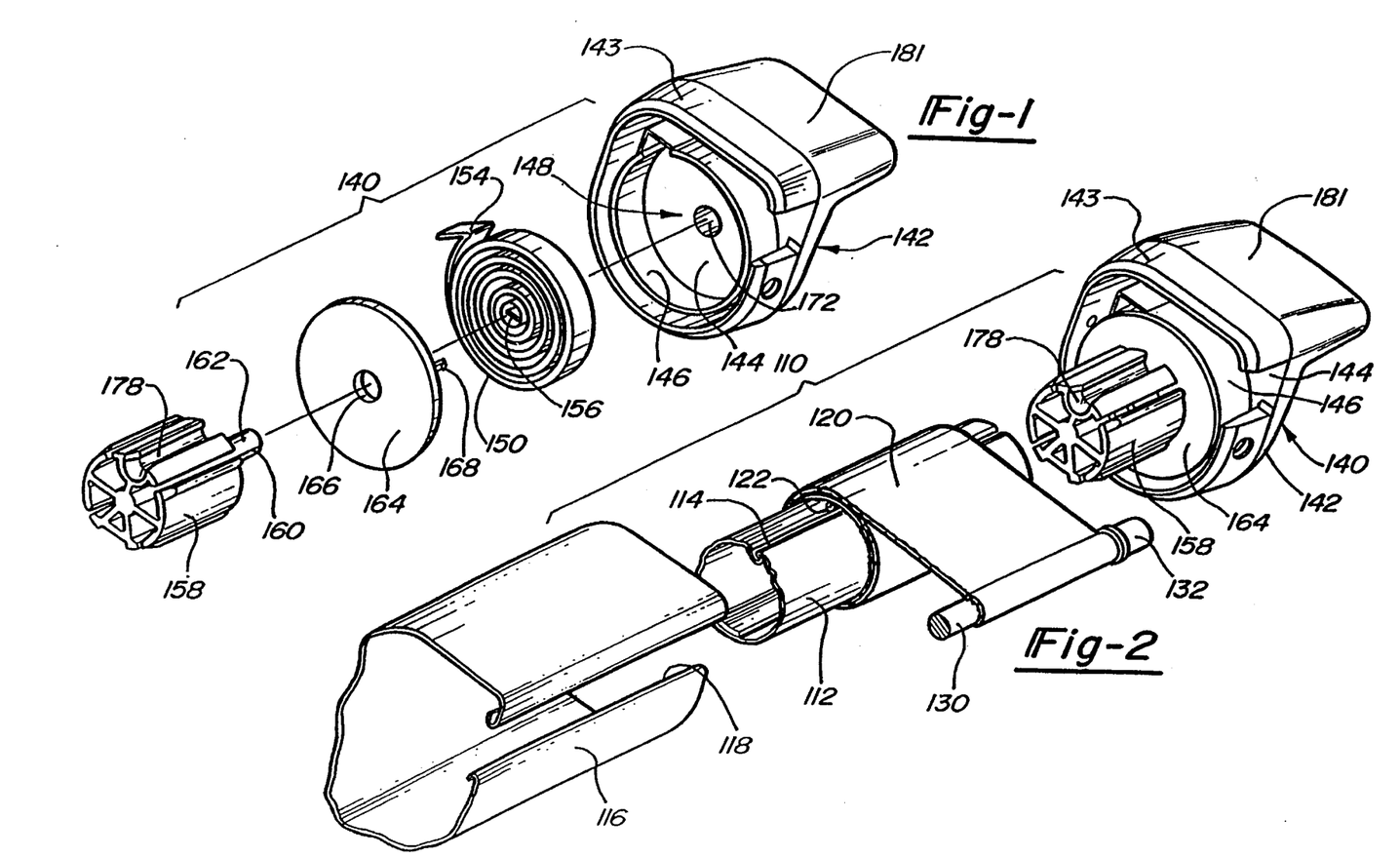
FIG. 1 is an exploded perspective view of one embodiment of a roller tube support subassembly according to the principles of the present invention.
FIG. 2 is an exploded perspective view of one end of a security shade embodying the principles of the present invention.

As seen in FIG. 1, the subassembly 140 includes a housing 142 comprised of an outboard wall 144 having a depending wall or skirt 146 which cooperates to define a receiving cavity 148 into which a motor spring 150 is positioned. Additionally, an inboard wall or dust cover 164 is secured to the skirt 146 by tabs 168 to fully enclose the motor spring 150.

The motor spring 150 is mounted in the housing 142 so that it will provide a rotational biasing force to the roller tube 112. To achieve this, one end 154 of the motor spring 150 is fixedly or rigidly attached to the housing 142 while the opposing or movable end 156 of the motor spring 150 is attached to a bearing 158 that couples and transfers rotation from the subassembly 140 to the roller tube 112.

Figures 3, 4:
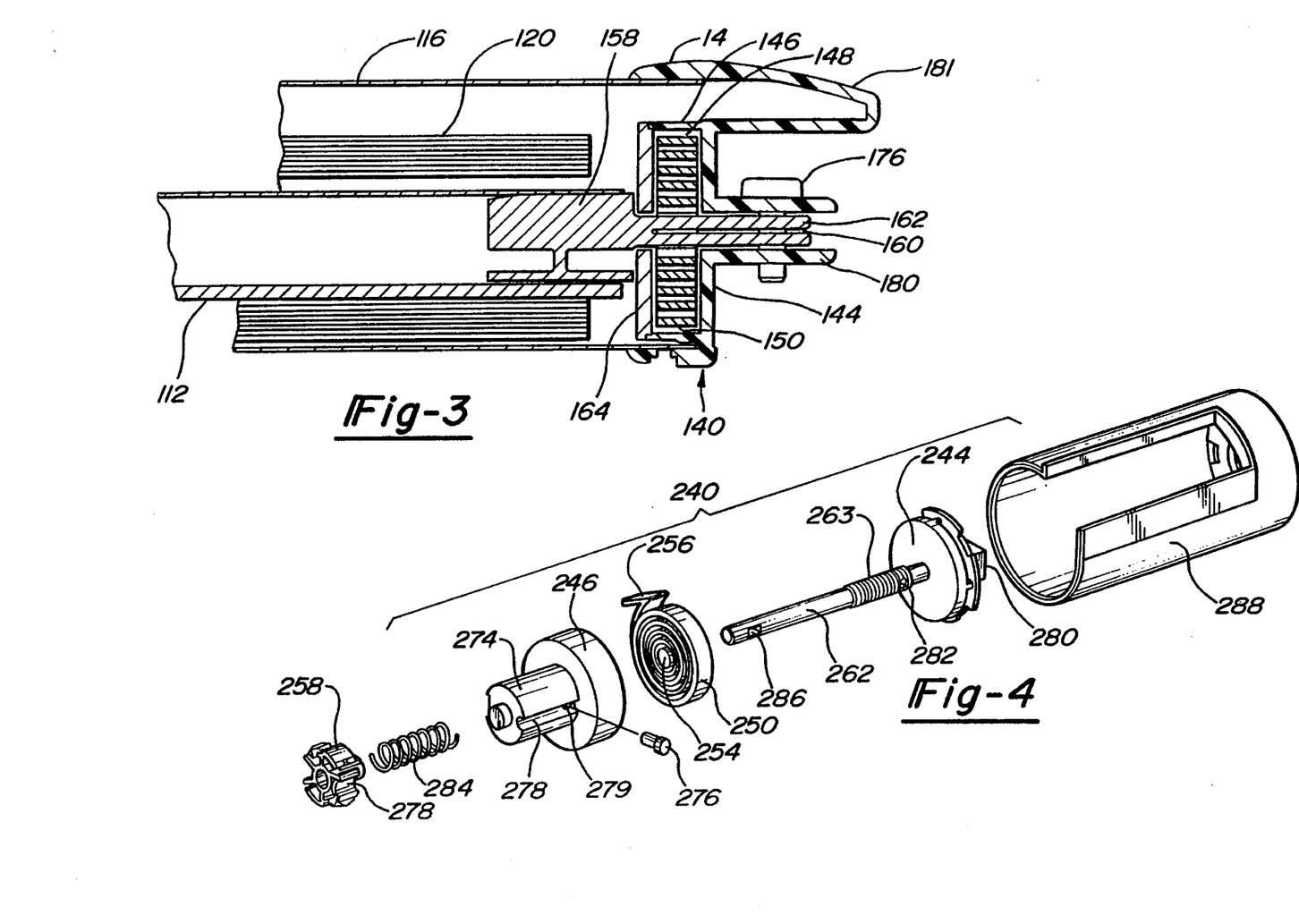
FIG. 3 is a longitudinal sectional view of one end of a security shade according to the embodiment seen in FIG. 2.
FIG. 4 is an exploded perspective view of another embodiment of a roller tube support subassembly embodying the principles of the present invention.

In the illustrated embodiment of FIGS. 1–3, the motor spring 150 is provided as a coil spring (in the shape of a generally planar spiral) having its radial outer end as its fixed end 154 and its radially inner end as its rotatable end 156. The rotatable end 156 of the motor spring 152 is received within a slot 160 formed in a central axle 162 extending from the bearing 158 through an aperture 166 in the dust cover 164 and an aperture 172 in the outboard wall 144.

The axle 162 is also provided with a longitudinal flat 170. Extended through the outboard wall 144 of the housing 142, the axle 162 is positioned within a boss 180 on the opposing side of the outboard wall 146. The boss 180 is configured to transversely receive a pin 176 therethrough. The pin 176 engages the flat 170 on the axle and, in this manner, locks out and prevents the bearing 158 from rotating under the influence of the motor spring 152 after an initial prewind. Thus, the subassembly 140 can maintain its prewind until the subassembly 140 is further assembled with the roller tube 112 to form the final construction of the security shade 110.

The roller tube 112 is hollow and provided with a diameter and configuration which correspond to the exterior size and shape of the bearing 158. The bearing 158 includes a groove 178 which receives that portion of the roller tube 112 defining the anchor groove 114 preventing relative rotation therebetween during operation of the security shade 110. During final assembly of the security shade 110, the roller tube support subassembly 140 is mounted to the roller tube 112 by inserting the bearing 158 into the roller tube 112. Once this has been achieved, the pin 176 can be removed and the prewind of the motor spring 150 will be maintained by the pull tube 130 and clips 132 engaging portions of the subassembly's housing 142. The trim cover 116 is then fitted over the roller tube 112 and shade panel 120 so that it engages a flange 143 of the housing 142.

A boss 180 is employed as a means for mounting the security shade 110 to the interior of the vehicle. The boss means 180 is a generally square extension of the outboard wall 144 which engages a correspondingly shaped bracket secured within the vehicle. The bracket may provide for permanent or removable mounting of the security shade 110. Obviously, various other mechanism can be envisioned for mounting the security shade 110.

The subassembly 140 is also provided with an extension 181 which operates to enhance the appearance of the security shade 110 when installed in the vehicle. The extension 181 further cooperates with the mounting bracket to ensure that the security shade 110 is properly oriented in the vehicle.

Figures 5, 6:
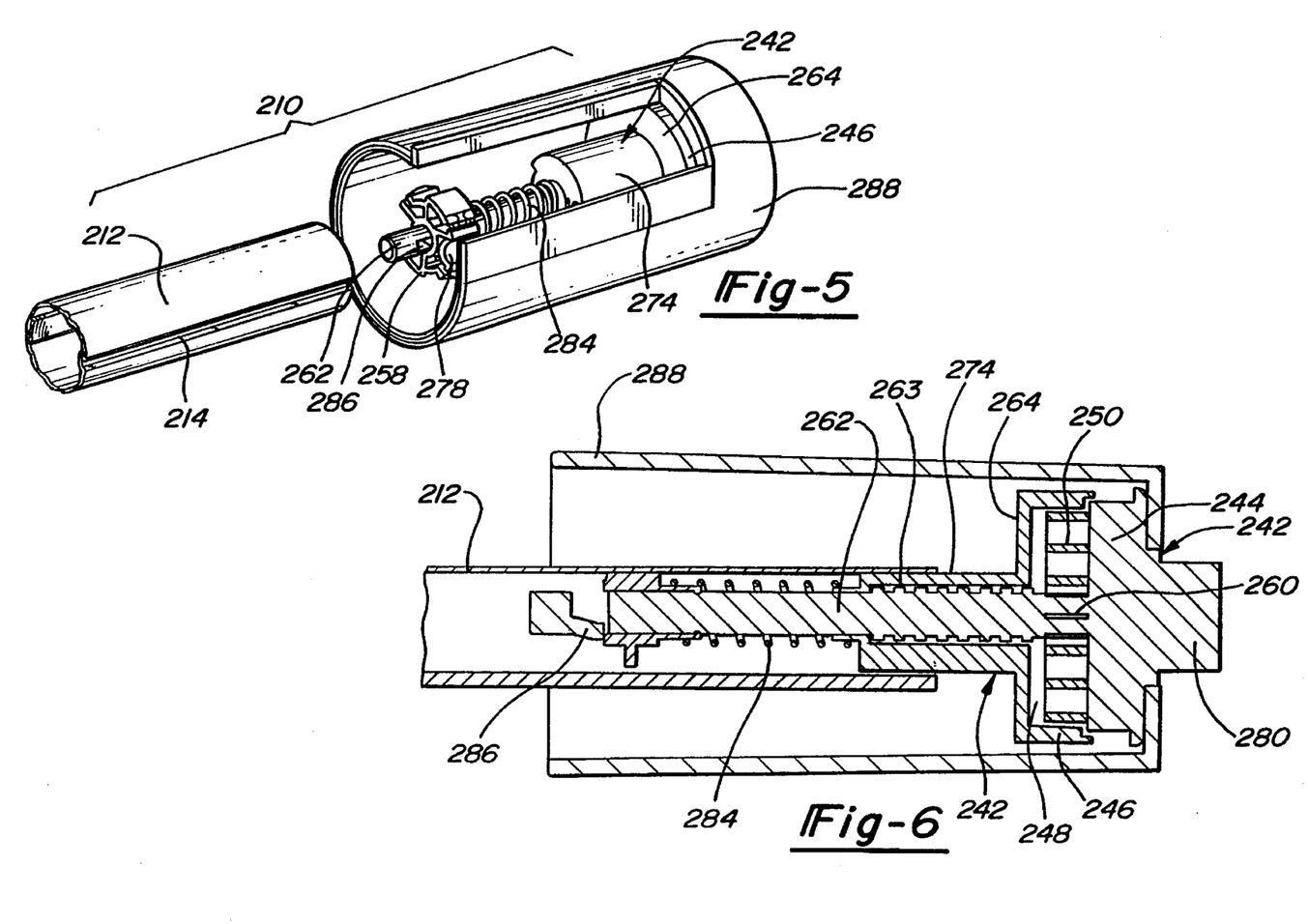
FIG. 5 is an exploded perspective view of the subassembly illustrated in FIG. 4 as it relates to additional components of a security shade according to this invention.
FIG. 6 is a longitudinal sectional view of the end of the security shade illustrated in FIG. 5.

Referring now to FIGS. 4–6, a second embodiment of the security shade 210 is illustrated therein. The primary differences between the security shade 210 of the second embodiment and that of the first are that the second embodiment lacks a trim cover but is provided with compressible ends to readily allow for insertion and removal of the security shade 210 from the vehicle.

Similar to the prior embodiment, the security shade 210 of the second embodiment includes a roller tube support subassembly 240 which mounts to the ends of the roller tube 212. For the sake of clarity, the shade panel and pull tube have been omitted from the remaining FIGS. The subassembly 240 again includes a housing 242 enclosing a motor spring 250. The housing 242 is composed of an outboard wall 244 and an inboard wall 264, as well as a skirt 246 which extends in the outboard direction from the inboard wall 264 to define a receiving cavity 248. The rotatable end 256 of the motor spring 250 is attached to the skirt 246 and inboard wall 264 while the fixed end 254 is coupled to the outboard wall 244 by a central shaft 262 extending from the outboard wall 244, in an inward direction. This shaft 262 is provided with a slot 260 that receives the fixed end 254 of the motor spring 250. Thus, the inboard wall 264 and skirt 246 rotate relative to the outboard wall 244.

In addition to connecting the fixed end 254 of the spring 250 to the outboard wall 244, the shaft 262 is provided with bearing surfaces 263 which support the inboard wall 264 and skirt 246 through engagement with a cylindrical inboard extension 274 of the inboard wall 264.

The prewind of the motor spring 250 is maintained by a pin 276 extended through an aperture 279 in the extension 274 into a bore 282 transversely defined in the shaft 262 thereby preventing relative rotation between the inboard wall 264 and the outboard wall 244.

To facilitate axial compression of the subassembly 240 relative to the roller tube 212, a compression spring 264 is positioned over the inboard end of the shaft 262 and retained thereon by a bearing 258 which is itself trapped and retained by a resilient tab 286 defined by the inboardmost end of the shaft 262. That portion of the roller tube 212 which defines the anchor groove 214 is received in a groove 278 defined in both the bearing 258 and extension 274. This prevents relative rotation between the roller tube 212 and the bearing 258 and extension 274. When properly mounted, the roller tube is not completely fitted over the extension 274 but is spaced from the inboard wall 264. The spacing allows for axial end play, compression of the compression spring 284, and relative axial movement of the subassembly 240 with respect to the roller tube 212.

This compressibility enables a mounting boss 280 to be easily engaged/disengaged with the bracket on the vehicle (not shown) promoting insertion and removal of the security shade 210 from the vehicle. The boss 280 may be square or otherwise shaped to prevent rotation of the security shade 210 in the mounting bracket. Additionally, the subassembly 240 is provided with an end cap 288, secured to the outboard wall 244, which protect the mechanical components of the security shade 210 and keeps foreign materials from interfering with its operation shade panel.

Figures 7, 8:
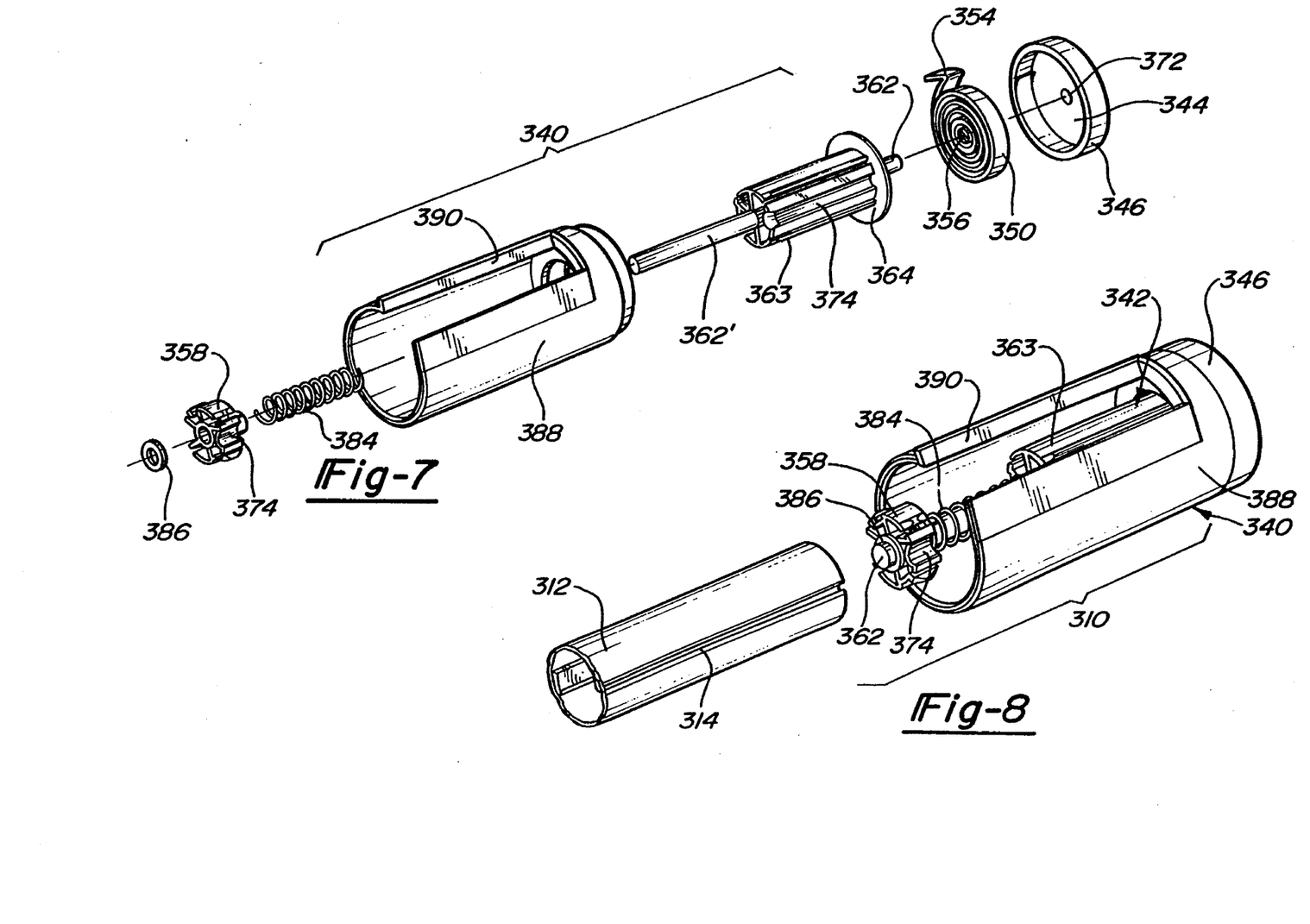
FIG. 7 is an exploded perspective view of still another embodiment of a roller tube support subassembly incorporating the principles of the present invention.
FIG. 8 is an exploded perspective view of the subassembly shown in FIG. 7 as it relates to additional components of a security shade.
Figures 9, 10:
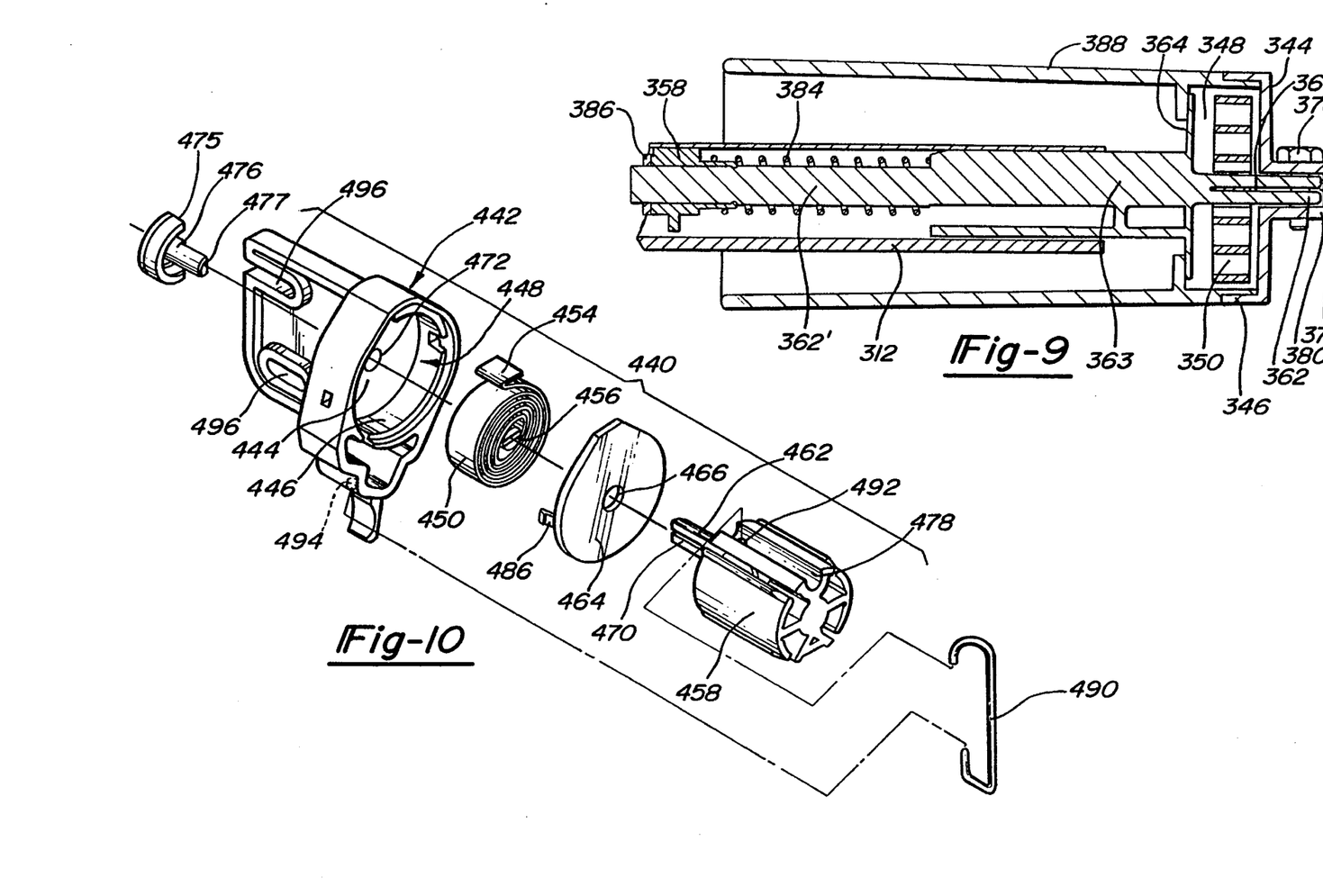
FIG. 9 is a longitudinal sectional view of the end of the security shade illustrated in FIG. 8.
FIG. 10 is an exploded perspective view of yet another embodiment of a roller tube support subassembly incorporating the principles of the present invention.

A security shade 310 according to a third embodiment of the present invention is generally illustrated in FIGS. 7 through 9. As with the second embodiment, the third embodiment lacks a cassette but includes a roller tube support subassembly 340 which forms a compressible end for a security shade 310.

The subassembly 340 includes a housing 342 defining a receiving cavity 348 for a motor spring 350. The receiving cavity is more specifically defined by an outboard wall 344, from which a depending skirt 346 extends in an inboard direction before terminating adjacent to an inboard wall 364.

The inboard wall 364 includes an integral axle 362 which extends in an outboard direction and which defines a slot 360 that receives the rotatable end 356 of the motor spring 350. The fixed end 354 of the motor spring 350 is secured to the depending skirt 346 and the outboard wall 344. The axle 362 further extends through the outboard wall 344 and into a recess 372 defined by a mounting boss 380. Within this recess 372, the axle 362 is engaged by a transversely extended pin 376 that prevents relative rotation between the outboard wall 344 and the inboard wall 364 and maintains the prewind of the motor spring 350. A second axle 362', coaxial with the first, extends in the inboard direction from the inboard wall 364 and is provided with a increased diameter portion 363. The increased diameter portion 363 assists in supporting the roller tube 312.

Inboard of the increased diameter portion 363, a compression spring 384 is received over the axle 362' and retained by a bearing 358 and snap ring 386. This provides the subassembly 340 with its axial compressibility. The anchor groove 314 of the roller tube 312 is received within a groove 374 defined in the bearing 358 and in the increased diameter portion 363. This prevents relative rotation between the roller tube 312 and the inboard wall 364 while allowing the roller tube 312 to rotate under the influence of the motor spring 350.

Differing from the second embodiment, the housing 342 and the motor spring 350 of the subassembly 340 are positioned outboard of an end cap 388 that protects the ends of the shade panel from foreign materials that might interfere with the operation of the security shade 310. A slot 390 is again defined in the end cap 388 to allow the shade panel to be extended therethrough. As seen in FIG. 9, the outboard end of the end cap 388 is configured to engage the skirt 346 of the outboard wall 344 thereby additionally protecting the mechanical components of the security shade 310.

Formed on the outboard side of the outboard wall 344, a square mounting boss 380 prevents the security shade from rotating relative to a mounting bracket on the vehicle side wall.

Figure 11:
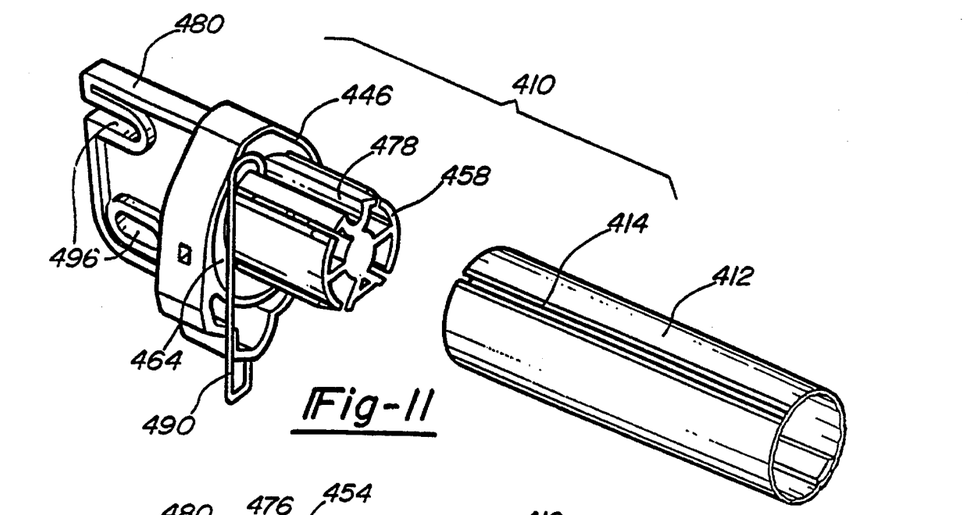
FIG. 11 is an exploded perspective view of the subassembly illustrated in FIG. 10 as it relates to additional components of a security shade.
Figure 12:
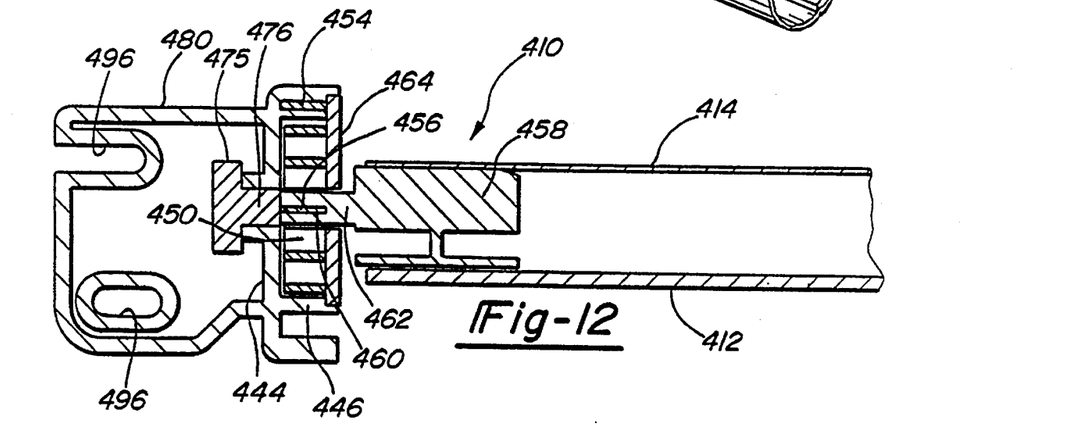
FIG. 12 is a longitudinal sectional view of the end of the security shade illustrated in FIG. 11.

Referring now to FIGS. 10–12, a fourth embodiment of a security shade 410 incorporating the principles of the present invention is illustrated therein as a non-cassette version without compressible ends. As with the prior embodiments, a support subassembly 440 includes a housing 442 in which the motor spring 450 is received in a receiving cavity 448. The receiving cavity 448 itself is defined by an outboard wall 444 from which extends, in the inboard direction, a depending skirt 446 and to which is attached, by tabs 486 or other means, an inboard wall or dust cap 464.

The motor spring 450 again rotationally biases a bearing 458. The bearing 458 includes an axle 462 extended through an aperture 466 in the dust cover 464, centrally through the motor spring 450 and subsequently through an aperture 472 in the outboard wall 444. A longitudinal slot 460 is formed in the axle 462 to receive the rotational end 458 of the motor spring 450. The non-moving or fixed end 454 of the motor spring 450 is provided with a return bent portion that engages a slot, catch, recess, or similar feature formed interiorly on the skirt 446.

Once the motor spring 450 and the bearing 458 have been assembled together and the initial prewind of the motor spring 450 has been provided, the subassembly 440 is capable of preventing the loss of prewind prior to mounting of the subassembly 440 with the remainder of the security shade 410. Two means for preventing this loss are illustrated in FIG. 10–12.

The first is similar to that shown in the first embodiment, namely, a flat 470 is formed on the axle 462 and a correspondingly shaped pin 476 is used to engage the flat 470 thereby preventing rotation. In this fourth embodiment, however, the pin 476 is provided with a corresponding flat 477 and is axially inserted into side-by-side engagement with the flat 470 of the axle 462. The pin 476 is also provided with a semicircular head 475 that engages a portion of the mounting means 460 during attempted rotation thereby inhibiting rotation of both the pin 476 and the bearing 458.

The second mechanism for preventing relative rotation and a loss of the motor spring's prewind includes a clip 490. When using the clip 490, relative rotation is prevented by one end of the clip 490 being inserted into a bore 492 defined in the bearing 458 while the remaining end of the clip 490 is inserted into bore 494 defined in the housing 442 of the subassembly 440. The bearing 458 has an outer diameter which generally corresponds to the inner diameter of the roller tube 412 and is provided with a groove 478 that receives the anchor groove 414 of the roller tube 412 as in the previous embodiments. Use of the clip 490 necessitates that the roller tube 412 is only partially Inserted onto the bearing 458, prior to removal of the clip 490, while use of the pin 476 allows for the roller tube 412 to be fully inserted onto the bearing 458 prior to its removal.

As briefly mentioned above, the subassembly 440 also includes a mounting means 480 or bracket having recesses and apertures 496 which enable the security shade 410 to be secured to the interior of a vehicle either in a permanent fashion by screws (or other fasteners) or in semi-permanent fashion.

Figure 13:
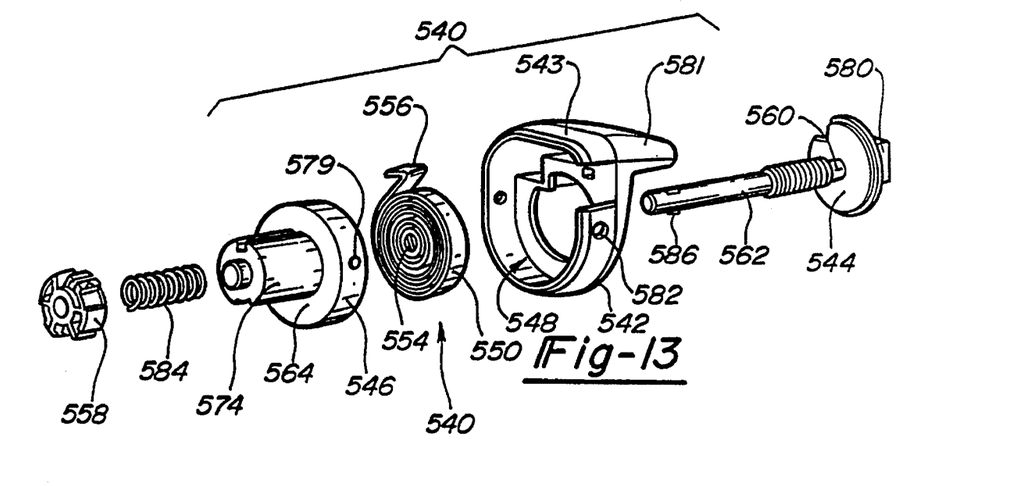
FIG. 13 is an exploded perspective view of a roller tube support subassembly according to the principles of the present invention.
Figure 14:
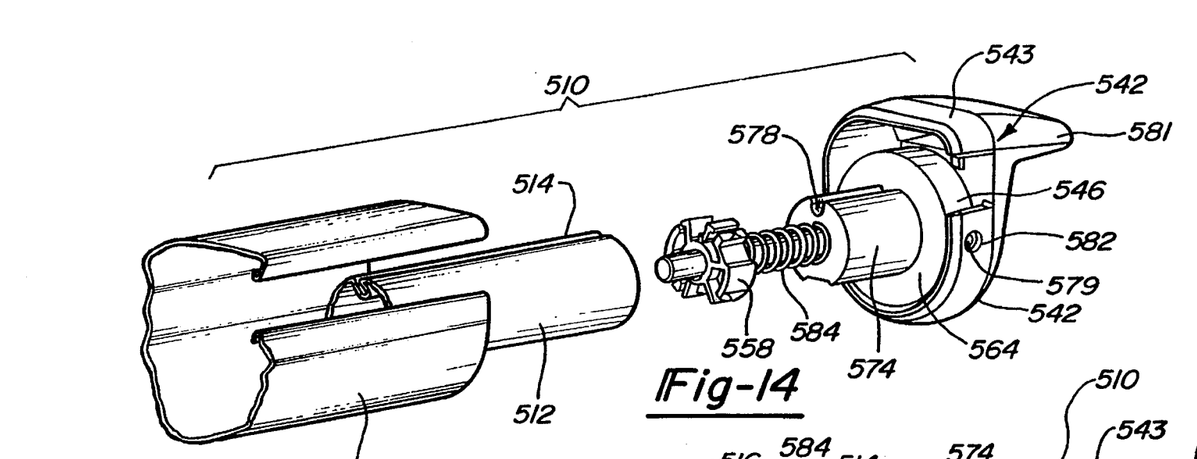
FIG. 14 is an exploded perspective view of the subassembly shown in FIG. 13 as it relates to various other components of a security shade according to this invention.
Figure 15:
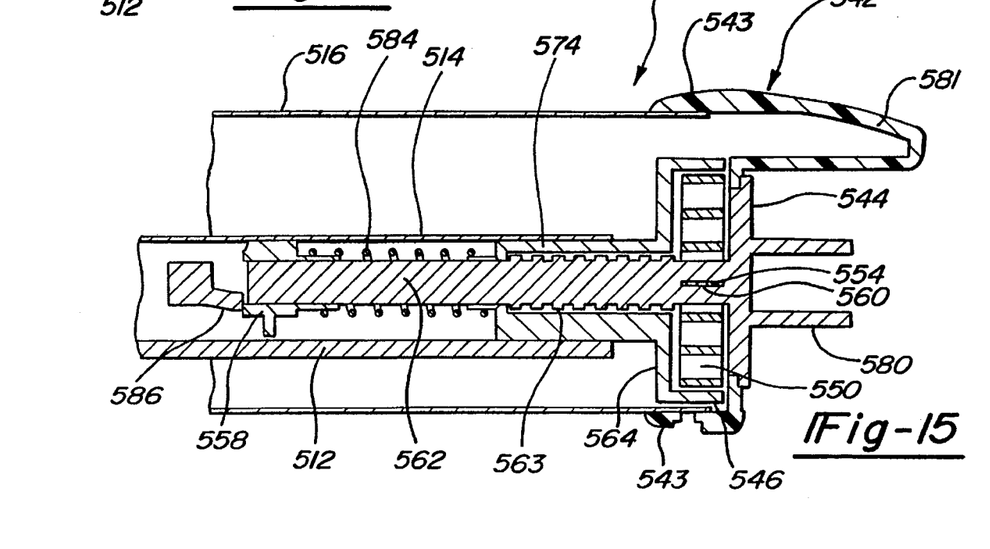
FIG. 15 is a longitudinal sectional view of the end of the security shade generally illustrated in FIG. 14.

The fifth, and final embodiment discussed herein, of the security shade 510 is illustrated in FIGS. 13–15 as a cassette version having compressible ends. The security shade 510 of the fifth embodiment includes a roller tube support subassembly 540 which receives both a roller tube 512 and a trim cover 516. A separate housing 542 cooperates with an outboard wall 544 and an inboard wall 564, from which a depending skid 546 extends in the outboard direction, to define a receiving cavity 548 for a motor spring 550. In this fifth embodiment, the motor spring 550 rotationally biases the skid 546 and inboard wall 564 to cause rotation of the roller tube 512. Therefore, the rotatable end 556 of the motor spring 550 is configured with a return bent portion that engages a catch or other feature on the interior surface of the skid 546. The fixed non-rotating end 554 of the spring 550 is received in a slot 560 defined in a shaft 562 extending from the outboard wall 544 in the inboard direction.

The shaft 562 is also provided with an increased diameter portion that defines bearing surfaces 563 which support an inboard extension 574 of the inboard wall 564. The inboard extension 574 operates as a bushing or bearing and has a diameter substantially conforming to the inner diameter of the roller tube 512 and allowing the roller tube 512 to be received thereon. To facilitate receipt of the roller tube 512, the extension 574 is provided with a groove 578 which receives the anchor groove 514 of the roller tube and prevents relative rotation therebetween.

Also positioned on the shaft 562 and located inboard of the inboard extension 574, is a compression spring 584. The compression spring 584 is retained by a bearing 558 fitted onto the shaft 562 and a resilient tab 586 formed in the shaft 562. The tab 586 deflects radially outwardly, trapping the bearing 558, after the bearing 558 has been inserted onto the shaft 562.

The prewind of the spring 550 is maintained by inserting a pin (not shown) through an aperture 582 formed in a trim flange 543 of the housing 542 and into a second aperture 579 defined in the skirt 546.

As seen in FIG. 15, the roller tube 512 is inserted onto the bearing 558 and extension 574 so that the outboard end of the roller tube 512 is spaced apart from the inboard wall 564. Cooperation between the compression spring 584 and the above mentioned spacing provides the subassembly 540 with its axial compressibility. Similarly, the trim cover 516 is provided a degree of axial end play relative to the housing 542.

The compressibility of the ends allows for easy mounting and removal of the security shade 510 from the interior of the vehicle. To prevent rotation of the security shade 510 once mounted, the mounting boss 580 is formed on the outboard wall 544. The mounting boss 580 has a shape which corresponds to a mounting bracket (not shown) in the vehicle so that rotation of the entire security shade 510 during extension and retraction of the shade panel is inhibited. The housing 542 is also provided with a trim extension 581, similar to that discussed in connection with the first embodiment. The trim extension 581 properly orients the security shade 510 and enhances its appearance when mounted in the vehicle.

As seen by the above discussion, the various embodiments of the present invention simplify the construction of the security shade. Also, the individual components can be used on either the right or left end of the shade with the only variation between left and right subassemblies being the orientation of the spring for proper biasing.

It is to be understood that the invention is not limited to the exact construction illustrated and described above, but that various changes and modifications may be made without departing from the spirit and scope of the invention as defined in the following claims.

We claim:

1. A security shade support subassembly for a security shade having a roller tube onto which is mounted a flexible panel that can be deployed in a cargo area of a motor vehicle to obstruct the view into the cargo area, said support subassembly comprising:

a housing;

an outboard end wall;

an inboard end wall;

a skirt, said skirt extending generally between said outboard end wall and said inboard end wall and cooperating therewith to define a receiving cavity;

a coupler supported by said housing and adapted to couple said subassembly to said roller tube such that said receiving cavity is outboard relative to said roller tube, said coupler being supported for relative rotation with respect to said housing;

rotational biasing means secured to said housing and to said coupler and disposed within said receiving cavity for rotationally biasing said coupler, inducing rotation of said roller tube and causing said shade panel to be wrapped onto said roller tube in a stored position;

mounting means for mounting said security shade within the motor vehicle such that said shade panel can be deployed to obstruct the view into the cargo area of the motor vehicle; and retention means for maintaining said subassembly in a fully assembled condition prior to said subassembly being mounted to said roller tube.

2. A subassembly as set forth in claim 1 wherein said biasing means is a motor torsion spring.

3. A subassembly as set forth in claim 2 wherein said motor spring is a coil spring formed of a flat strip wrapped in a planar spiral configuration.

4. A subassembly as set forth in claim 1 wherein said biasing means is a torsion spring having a fixed end and a movable end, said fixed end being secured to a portion of said housing so as to be non-movable with respect thereto, said movable end being secured to a portion of said coupling means and being generally movable with respect to said housing.

5. A subassembly as set forth in claim 1 wherein said housing includes portions at least partially defining said receiving cavity.

6. A subassembly as set forth in claim 5 wherein said outboard wall, said inboard wall and said skirt are a portion of said housing and cooperate to define said receiving cavity.

7. A subassembly as set forth in claim 6 wherein said skirt depends from said outboard wall and is rotatable therewith forming a portion of said coupler.

8. A subassembly as set forth in claim 1 wherein said skirt depends from said inboard wall and is rotatable therewith forming a portion of said coupler.

9. A subassembly as set forth in claim 1 wherein said skirt is generally immovable in rotation and forms a portion of said housing.

10. A subassembly as set forth in claim 1 wherein said outboard wall is movable in rotation and forms a portion of said coupler.

11. A subassembly as set forth in claim 1 wherein said coupler includes a bearing portion coupled to said biasing means and supporting said roller tube.

12. A subassembly as set forth in claim 1 further comprising means for axially moving said subassembly relative to said roller tube when mounted thereto.

13. A security shade for the cargo area of a motor vehicle to obstruct viewing into said cargo area, said security shade comprising:

a roller tube having ends;

a flexible shade panel having a fixed edge and a free edge, said fixed edge being affixed to said shade panel;

a support subassembly mounted to a least one of said ends of said roller tube and adapted to engage a portion of the vehicle to support said security shade therein, said subassembly having:
  a housing;
  an outboard end wall;
  an inboard end wall;
  a skirt, said skirt extending generally between said outboard end wall and said inboard end wall and cooperating therewith to define a receiving cavity;
  coupling means supported by said housing for coupling said subassembly to said roller tube such that said receiving cavity is outboard relative to said roller tube, said coupling means being rotationally movable relative to said housing;
  rotational biasing means secured to said housing and to said coupling means and disposed within said receiving cavity for rotationally biasing said coupling means, inducing rotation of said roller tube and causing said shade panel to be wrapped onto said roller tube in a stored position;
  mounting means for mounting said security shade within the motor vehicle such that said shade panel can be deployed to obstruct viewing into the cargo area of the motor vehicle; and
  retention means for maintaining said subassembly in a fully assembled condition prior to said subassembly being mounted to said roller tube.

14. A subassembly as set forth in claim 13 wherein said biasing means is a coil torsion spring having a movable radially inner end and a radially outer fixed end, said movable end being connected to a portion of said coupling means and said fixed end being connected to a portion of said housing.

15. A subassembly as set forth in claim 13 wherein said biasing means is a coil torsion spring formed of a flat strip wrapped in a planar spiral configuration having a movable radially outer end and a fixed radially inner end, said movable end connected to a portion of said coupling means and a generally fixed end connected to a portion of said housing, said movable end being a radially outer end of said coil spring.

16. A subassembly as set forth in claim 13 further comprising means for axially moving at least portions of said subassembly relative to said roller tube when mounted thereto to permit said security shade to exert a biasing force against components of said motor vehicle cargo area.

17. A security shade for the cargo area of a motor vehicle to prevent viewing into the cargo area, said security shade comprising:

a roller tube having ends;

a flexible shade panel having a fixed edge and a free edge, said fixed edge being affixed to said roller tube;

a support subassembly mounted to at least one of said ends of said roller tube and adapted to engage the vehicle to support said security shade therein, said subassembly further having:
  a housing;
  an outboard end;
  an inboard end wall;
  a skirt, said skirt extending generally between said outboard end wall and said inboard end wall and cooperating therewith to define a receiving cavity;
  a coupler supported by said housing and adapted to couple said subassembly to said roller tube such that said receiving cavity is outboard relative to said roller tube;
  a motor torsion spring positioned within said receiving cavity, said motor means rotationally biasing said coupler and inducing rotation of said roller tube thereby causing said shade panel to be wrapped onto said roller tube in a stored position said motor spring in the form of a flat strip wrapped in a planar spiral configuration;
  lock out means of inhibiting relative rotation between said housing and said coupler, said lock out means maintaining said motor spring in a prewound condition prior to engagement of said subassembly with said roller tube;
  mounting means for mounting said security shade within the motor vehicle such that said shade panel can be deployed to obstruct viewing into the cargo area of the motor vehicle; and
  retention means for maintaining said subassembly in a fully assembled condition prior to said subassembly being mounted to said roller tube.

18. A security shade as set forth in claim 17 wherein said lock out means interferingly engages a portion of said coupler and a portion of said housing thereby inhibiting relative movement therebetween.

19. A security shade as set forth in claim 17 wherein said lock out means is a pin interferingly engaged between a portion of said coupler and said housing.

20. A security shade as set forth in claim 17 wherein at least a portion of said subassembly is axially movable with respect to said roller tube when mounted thereto to permit said security shade to exert a biasing force against components of said motor vehicle cargo area.

21. A subassembly as set forth in claim 1 further comprising lock-out means for maintaining said rotational biasing means in a prewound condition upon installation of said support subassembly with said roller tube.

22. A subassembly as set forth in claim 21 wherein said lock-out means comprises a pin engaging said housing and said coupler for preventing relative rotation therebetween.

23. A subassembly as set forth in claim 13 further comprising lock-out means for maintaining said rotational biasing means in a prewound condition upon installation of said support subassembly with said roller tube.

24. A subassembly as set forth in claim 23 wherein said lock-out means comprises a pin engaging said housing and said coupler for preventing relative rotation therebetween.

* * * * *

UNITED STATES PATENT AND TRADEMARK OFFICE
CERTIFICATE OF CORRECTION

PATENT NO. : 5,464,052
DATED : November 7, 1995
INVENTOR(S) : Joseph P. Wieczorek, Eugene M. Halajian, Michael Trombley It is certified that error appears in the above-indentified patent and that said Letters Patent is hereby corrected as shown below:

Column 9, line 43, Claim 13, after "to" delete "a" and insert --at--.

Signed and Sealed this

Ninth Day of July, 1996

Attest:

BRUCE LEHMAN

Attesting Officer        Commissioner of Patents and Trademarks